(12) United States Patent
Aoki et al.

(10) Patent No.: US 7,152,586 B2
(45) Date of Patent: Dec. 26, 2006

(54) FUEL CUT-OFF VALVE

(75) Inventors: Tomohide Aoki, Aichi-ken (JP); Natsushi Miura, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/212,116

(22) Filed: Aug. 26, 2005

(65) Prior Publication Data
US 2006/0042690 A1 Mar. 2, 2006

(30) Foreign Application Priority Data
Aug. 30, 2004 (JP) ............................. P2004-250175
Apr. 5, 2005 (JP) ............................. P2005-108337

(51) Int. Cl.
*F02M 37/20* (2006.01)
*F16K 24/04* (2006.01)

(52) U.S. Cl. ........................................ 123/516; 137/202
(58) Field of Classification Search ................ 123/516, 123/518, 519; 137/202, 43; 251/126, 127
See application file for complete search history.

(56) References Cited

U.S. PATENT DOCUMENTS

| 6,085,771 | A * | 7/2000 | Benjey et al. ............ 137/15.26 |
| 6,343,590 | B1 * | 2/2002 | Nagai et al. ................. 123/518 |
| 6,425,379 | B1 * | 7/2002 | Shimamura et al. ......... 123/516 |
| 6,439,206 | B1 * | 8/2002 | Shimamura et al. ......... 123/516 |
| 6,557,578 | B1 * | 5/2003 | Shimamura et al. ......... 137/302 |
| 6,779,544 | B1 * | 8/2004 | Devall ......................... 137/202 |
| 2001/0004890 | A1 * | 6/2001 | Shimamura et al. ......... 123/516 |
| 2001/0054438 | A1 | 12/2001 | Shimamura et al. |
| 2005/0133089 | A1 * | 6/2005 | Takahashi et al. .......... 137/202 |

FOREIGN PATENT DOCUMENTS

| JP | B2-3201253 | 6/2001 |
| JP | A-2002-4966 | 1/2002 |

* cited by examiner

*Primary Examiner*—Mahmoud Gimie
(74) *Attorney, Agent, or Firm*—Posz Law Group, PLC

(57) ABSTRACT

A fuel cut-off valve 100 of the invention is attached to an upper portion of a fuel tank and connects and disconnects inside with and from outside of the fuel tank according to the fuel level in the fuel tank. In the fuel cut-off valve 100 of the invention, a valve casing 110 forms a first valve chest 120 and a second valve chest 130 connected to the fuel tank and has an inter-valve chest flow passage 112 connecting the first valve chest 120 to the second valve chest 130 and a canister connection port 102 connecting the second valve chest 120 to a canister placed outside the fuel tank. A first float 124 and a second float 134 are respectively located in the first valve chest 120 and in the second valve chest 130. When the fuel level in the fuel tank rises to reach a preset first level FL1, the first float 124 moves up to close an opening 122 and thereby close the inter-valve chest flow passage 112. When the fuel level in the fuel tank further rises to reach a preset second level FL2 that is higher than the preset first level FL1, the second float 134 moves up to close an upstream end opening 132 of the canister connection port 102 and cut off the flow of fuel vapor to the canister. This arrangement of the invention effectively ensures the sufficient performances and the enhanced reliabilities of the leakage protection function and the backflow prevention function of the fuel cut-off valve.

7 Claims, 4 Drawing Sheets

FUEL CUT-OFF VALVE

CLAIM OF PRIORITY

The present application claims priority from Japanese Applications P2004-250175 filed on Aug. 30, 2004, and P2005-108337 filed on Apr. 5, 2005, the content of which is hereby incorporated by reference into these applications.

BACKGROUND OF THE INVENTION

1. Field of the Invention

The present invention relates to a fuel cut-off valve that is attached to an upper portion of a fuel tank and connects and disconnects inside with and from outside of the fuel tank according to the fuel level in the fuel tank.

2. Description of the Related Art

Fuel cut-off valves are generally structured to open and close the conduit for leading the fuel vapor to a canister and exert various functions in the open state and the closed state of the conduit. Known fuel cut-off valves have a backflow prevention function to close the conduit at a fuel level close to the full level of a fuel tank and thereby control any further fuel supply with a pressure sensing-type refueling gun and a leakage protection function to prevent the liquid fuel from flowing into the conduit (see, for example, Patent Documents 1 and 2).

Patent Document 1: Japanese Patent No. 3201253

Patent Document 2: Japanese Patent Laid-Open Gazette No. 2002-4966

The fuel cut-off valve disclosed in Patent Document 1 has two valve plugs in separate valve chests. One valve plug opens and closes a vent conduit 22a, whereas the other valve plug opens and closes an orifice conduit 26 connecting with the vent conduit 22a. The fuel cut-off valve disclosed in Patent Document 2 has two valve plugs in separate valve chests. One valve plug opens and closes a valve port 66 according to the fuel level in a fuel tank, whereas the other valve plug placed outside the fuel tank opens and closes an opening 70 between the valve port 66 and a vent conduit 67. These proposed fuel cut-off valves attain both the backflow prevention function and the leakage protection function by closing of the flow path with the two valve plugs.

In the fuel cut-off valve of Patent Document 1, the orifice conduit 26 is linked to the vent conduit 22a in the upstream of the open and close position of the vent conduit 22a with the corresponding valve plug. A vehicle may abruptly turns or rolls on the rough road surface. Such an abrupt turn or roll may adversely affect the closing property of the valve plug and may cause imperfect closing of the flow path with the valve plug. The layout of the flow path in this prior art structure may cause the liquid fuel from directly entering the vent conduit 22a or entering the vent conduit 22a via the orifice conduit 26. This prior art structure accordingly has the low reliability of the leakage protection function. The high production accuracy of the respective elements of the valve plug closing mechanism and the high assembly accuracy are required to ensure the sufficient leakage protection function.

In the fuel cut-off valve of Patent Document 2, the closed state of the valve port 66 located in the fuel tank almost perfectly blocks the ventilation from the tank to the canister. This causes an abrupt increase in inner pressure of the fuel tank. An abrupt expansion of the compressed fuel vapor may lead to the backflow of the fuel or may delay the stop timing of the fuel supply with a refueling gun and cause the liquid fuel from flowing over a fill port. This prior art fuel cut-off valve thus additionally requires a separate backflow prevention mechanism.

SUMMARY

The advantage of some aspect of the invention is thus to eliminate the drawbacks of the prior art structures and to ensure sufficient performances and enhanced reliabilities of leakage protection function and backflow prevention function of a fuel cut-off valve.

In order to attain at least part of the above and the other related objects, the aspect of the present invention is directed to a fuel cut-off valve that is attached to an upper portion of a fuel tank and connects and disconnects inside with and from outside of the fuel tank according to the fuel level in the fuel tank. In the fuel cut-off valve of the invention, a valve casing forms a first valve chest and a second valve chest connected to the fuel tank and has an inter-valve chest flow passage connecting the first valve chest to the second valve chest and a canister flow path connecting the second valve chest to a canister placed outside the fuel tank. The fuel vapor entering the first valve chest flows through the inter-valve chest flow passage, the second valve chest and the canister flow path into the canister. The fuel vapor directly entering the second valve chest, on the other hand, flows through the canister flow path into the canister. Namely the fuel cut-off valve of the invention causes a first vapor current and a second vapor current as the flow of fuel vapor. The first vapor current flows through the first valve chest, the inter-valve chest flow passage, the second valve chest and the canister flow path into the canister. The second vapor current flows through the second valve chest and the canister flow path into the canister.

A first float and a second float are respectively located in the first valve chest and in the second valve chest. The first float moves up and down according to the fuel level in the first valve chest to open and close the inter-valve chest flow passage. The second float moves up and down according to the fuel level in the second valve chest to open and close the canister flow path. With a change of the fuel level, there is a time difference between closing of the flow passage by the first float and closing of the flow path by the second float. The first float moves up to close the inter-valve chest flow passage when the fuel level rises to reach a preset first level. The second float moves up to close the canister flow path when the fuel level further rises to reach a preset second level that is higher than the preset first level.

In the refueling process to supply the fuel to the fuel tank with the fuel cut-off valve of the invention, with an increase in fuel level in the fuel tank, the fuel vapor kept in the upper portion of the fuel tank is released as the first vapor current and the second vapor current through the fuel cut-off valve to the canister. When the fuel level in the fuel tank reaches the preset first level, the first float receives the buoyancy and moves up in the first valve chest to close the inter-valve chest flow passage. This cuts off the first vapor current in the flow of the fuel vapor and increases the inner pressure of the fuel tank to raise the fuel level in a filler pipe for fuel supply to the fuel tank.

A refueling gun generally has an auto stop function to automatically stop a further supply of the fuel, in response to detection of an increasing inner pressure of the fuel tank by a separate sensor or in response to detection of a rise of the fuel level in the filler pipe by the refueling gun. In this state, the first float closes the inter-valve chest flow passage, while the second float keeps the canister flow path open.

There is accordingly the second vapor current to flow the fuel vapor into the canister. This arrangement effectively prevents an abrupt increase in inner pressure of the fuel tank and thereby a resulting backflow of the fuel.

In the refueling process, when the fuel level further rises to reach the preset second level, the second float receives the buoyancy and moves up in the second valve chest to close the canister flow path. This cuts off the second vapor current and closes the inside of the fuel tank from the canister, thus effectively preventing the outflow of the liquid fuel into the canister.

The refueling gun automatically stops the fuel supply when the fuel level reaches the preset first level. The outflow of the fuel vapor in the second vapor current is, however, still allowed until the fuel level reaches the preset second level. Additional fuel supply with the refueling gun is thus allowed in the fuel level between the preset first level and the preset second level, and fully stops when the fuel level reaches the preset second level. This arrangement effectively controls the fuel supply to the full level of the fuel tank and enhances the reliability of the stable refueling level.

In the closed state of the inter-valve chest flow passage by the first float in the first valve chest, that is, in the cutoff state of the first vapor current, there is still the second vapor current in the second valve chest. Even if the cutoff of the first vapor current is imperfect, the leaked fuel vapor in the first vapor current joins with the fuel vapor in the second vapor current to be flowed out to the canister. This arrangement of the invention does not require the highly accuracy for the closing structure of the first float in the first valve chest and thus simplifies the structure of the first float.

In one preferable embodiment of the fuel cut-off valve of the invention, the valve casing has a first connection aperture that enables the fuel to be flowed into the first valve chest and vary a fuel level in the first valve chest, and a second connection aperture that enables the fuel to be flowed into the second valve chest and vary a fuel level in the second valve chest. The second connection aperture has a smaller opening area than an opening area of the first connection aperture. This arrangement controls refueling with the refueling gun and thus ensures the stable refueling level. The small opening area of the second connection aperture formed in the second valve chest also prevents an outflow of the liquid fuel through the second connection aperture into the canister.

In another preferable embodiment of the fuel cut-off valve of the invention, the valve casing has a ventilation hole that connects the second valve chest to the fuel tank and enables the fuel vapor to be flowed into the second valve chest. The ventilation hole has an opening diameter to control an inflow of the fuel vapor from the fuel tank into the second valve chest and thereby increase an inner pressure of the fuel tank when the first float closes the inter-valve chest flow passage. This arrangement ensures an increase in inner pressure of the fuel tank in the closed state of the inter-valve chest flow passage by the first float, thus enhancing the reliability of an auto stop function of the refueling gun.

In still another preferable embodiment of the fuel cut-off valve of the invention, the first valve chest and the second valve chest are arranged adjacent to each other, such that the first float and the second float move up and down in parallel with each other in the first valve chest and in the second valve chest. This layout effectively reduces the total height of the fuel cut-off valve. The arrangement of this embodiment desirably reduces the dead space for fuel storage in the vicinity of an upper wall of the fuel tank and increases the effective volume of the fuel tank.

In another preferable embodiment of the fuel cut-off valve of the invention, the valve casing is designed to discharge the fuel from the second valve chest into the fuel tank when the fuel level lowers below a bottom face of the valve casing. This design of the embodiment rapidly eliminates the buoyancy applied to the second float in the second valve chest at the lowered fuel level. The second float thus promptly moves down at the lowered fuel level to open the canister flow path. The arrangement of this embodiment effectively ensures the outflow of fuel vapor from the fuel tank to the canister.

The inter-valve chest flow passage of the valve casing connecting the first valve chest to the second valve chest may be extended to a lower end of the second valve chest. This layout makes an end of the inter-valve chest flow passage apart from the canister flow path. Even when the fuel flows from the first valve chest through the inter-valve chest flow passage into the second valve chest, this arrangement effectively prevents the outflow of the liquid fuel into the canister flow path and thereby into the canister.

In another preferable embodiment of the fuel cut-off valve of the invention, the valve casing has an inner-tank connection aperture that connects the second valve chest to the fuel tank even when the second float moves up to close the canister flow path. The inner-tank connection aperture enables the remaining vapor in the fuel tank to be flowed into the second valve chest at a decrease in fuel level in the second valve chest. The presence of the inner-tank connection aperture desirably prevents the second valve chest from having a negative pressure relative to the fuel tank at a decrease in fuel level in the second valve chest. This structure effectively prevents the second float from unnecessarily closing the canister flow path, but ensures the flow of fuel vapor from the fuel tank through the canister flow path into the canister.

These and other objects, features, aspects, and advantages of the present invention will become more apparent from the following detailed description of the preferred embodiments with the accompanied drawings.

DESCRIPTION OF THE PREFERRED EMBODIMENTS

A. First Embodiment (1) General Structure of Fuel Cut-Off Valve 100

Figure 1:
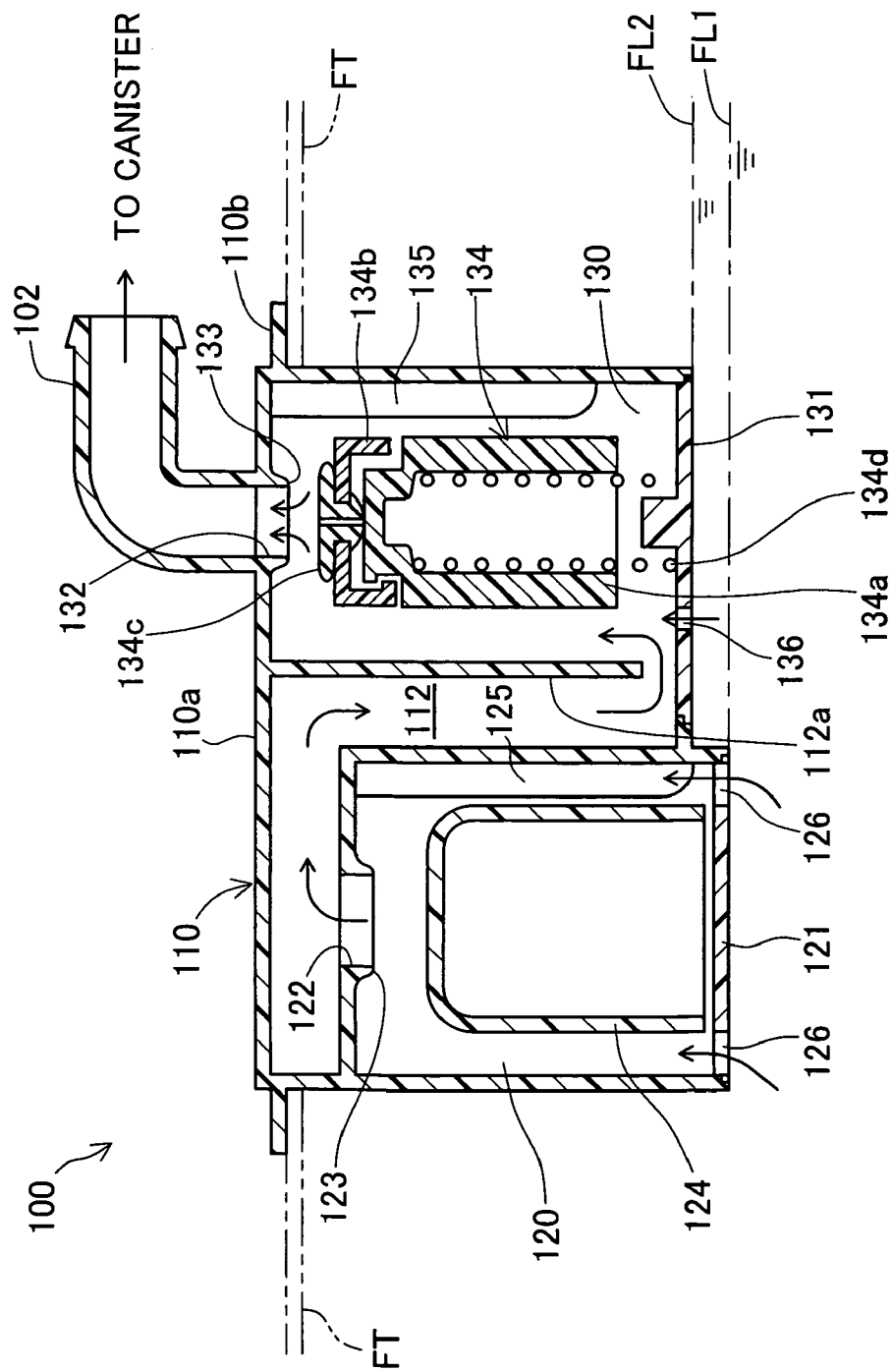
FIG. 1 is a sectional view schematically illustrating the structure of a fuel cut-off valve attached to an upper portion of a fuel tank of an automobile in a first embodiment of the invention.

FIG. 1 is a sectional view schematically illustrating the structure of a fuel cut-off valve 100 attached to an upper portion of a fuel tank FT of an automobile (not shown) in a first embodiment of the invention. In the structure of this embodiment, the fuel cut-off valve 100 is set on an upper wall of the fuel tank FT made of a polyethylene-containing complex resin material. The fuel cut-off valve 100 has a canister connection port 102 that is exposed outside the fuel tank FT and is connected to a canister (not shown). The fuel cut-off valve 100 may be designed as an inner tank type to be wholly built in the fuel tank FT.

In the refueling process, the fuel cut-off valve 100 partly closes with only a narrow opening left for ventilation when the fuel level in the fuel tank FT rises to a preset first level FL1. The fuel cut-off valve 100 completely closes to prevent an outflow of the liquid fuel to the canister when the fuel level in the fuel tank FT further rises to a preset second level FL2.

(2) Detailed Structure of Fuel Cut-Off Valve 100

The fuel cut-off valve 100 has the valve mechanism arranged in a valve casing 110 with the upwardly-protruded canister connection port 102. As illustrated in FIG. 1, the valve casing 110 has a first valve chest 120 (on the left side in the drawing) and a second valve chest 130 (on the right side in the drawing) located adjacent to each other. An upper casing member 110a of the valve casing 110 has a bottom opening to receive a first float 124 and a second float 134 therein (discussed later). A first valve chest plate 121 and a second valve chest plate 131 are fit in the bottom opening of the valve casing 110.

The upper casing member 110a of the valve casing 110 has a flange 110b for fixation to the fuel tank FT (for example, by thermal welding), in addition to the canister connection port 102 formed on the top face. The valve casing 110 also has an inter-valve chest flow passage 112 that is formed between the first valve chest 120 and the second valve chest 130 and connects the first valve chest 120 to the second valve chest 130. The fuel vapor flowed in the first valve chest 120 runs through the inter-valve chest flow passage 112 into the second valve chest 130.

The first valve chest 120 has an opening 122 formed in the top face thereof, and a seat element 123 formed around the periphery of the opening 122 and raised inward the inner space of the first valve chest 120. This structure enables the first float 124 to vertically go up and down in the inner space of the first valve chest 120. Multiple in-valve chest control plates 125 are arranged at equal pitches on the inner wall of the first valve chest 120. The multiple in-valve chest control plates 125 enable the first float 124 to move up and down with its axial center positioned at the substantial center of the opening 122. The first float 124 is lifted up and down by the inflow of the fuel through multiple connection apertures 126 formed at equal intervals in the first valve chest plate 121 into the inner space of the first valve chest 120. The first float 124 receives the buoyancy of the fuel flow entering the first valve chest 120 and moves up and down according to the fuel level in the fuel tank FT. The first float 124 comes into contact with and separates from the seat element 123 to open and close the opening 122.

The second valve chest 130 has an upstream end opening 132 of the canister connection port 102 formed in the top face thereof and a seat element 133 formed around the periphery of the upstream end opening 132 and raised inward the inner space of the second valve chest 130. This structure enables a second float 134 to vertically go up and down in the inner space of the second valve chest 130. Multiple in-valve chest control plates 135 are arranged at equal pitches on the inner wall of the second valve chest 130. The multiple in-valve chest control plates 135 enable the second float 134 to move up and down with its axial center positioned at the substantial center of the upstream end opening 132.

The second float 134 has a float body 134a, a valve disc support 134b, a valve disc 134c, and a spring 134d. The valve disc support 134b for supporting the valve disc 134c is caught by an upper end of the float body 134a. In the structure of the second float 134, while the pressing force of the spring 134d is applied toward the upstream end opening 132, the valve disc support 134b is vertically slidable relative to the float body 134a.

The second float 134 is lifted up and down by the inflow of the fuel through a single small-diameter connection aperture 136 formed in the second valve chest plate 131 into the inner space of the second valve chest 130. The second float 134 receives the buoyancy of the fuel flow entering the second valve chest 130 and moves up and down according to the fuel level in the fuel tank FT. The valve disc 134c of the second float 130 comes into contact with and separates from the seat element 133 to open and close the upstream end opening 132. The valve disc support 134b is vertically slidable relative to the float body 134a. This controls the closing and opening operations of the upstream end opening 132 as discussed below.

The disappearance or the decrease of the buoyancy given to the second float 134 causes the float body 134a to move down toward the second valve chest plate 131. The valve disc support 134b is, however, left at the closing position to keep the valve disc 134a in contact with the seat element 133. A further fall of the float body 134a drags the valve disc support 134b down to open the upstream end opening 132. The upstream end opening 132 is kept in the closed position in the initial stage of a fall of the second float 134. This arrangement delays the open timing of the upstream end opening 132.

The respective elements of the fuel cut-off valve 100 are made of an appropriate synthetic resin having high fuel resistance, for example, polyacetal or polyethylene. The preferable material for the seat elements 123 and 133 and for the first float 124 is polyacetal having the better fuel swelling performance than polyethylene to enhance the closing property. The top face of the upper casing member 110a and the flange 110b may be made of a different material, for example, polyethylene, to ensure the high thermal welding performance to the fuel tank FT.

(3) Operations of Fuel Cut-Off Valve 100

The fuel cut-off valve 100 having the above structure is operated in the following manner. In the refueling process to supply the fuel to the fuel tank FT, with a rise of the fuel level in the fuel tank FT, the fuel vapor kept in the upper portion of the fuel tank FT is released through the fuel cut-off valve 100 and the canister connection port 102 into the canister as described below. Before the fuel level in the fuel tank FT reaches the lower end of the fuel cut-off valve 100, the first float 124 and the second float 134 are respectively separate from the seat elements 123 and 133 in the corresponding first valve chest 120 and second valve chest 130 as shown in FIG. 1. Under such conditions, the fuel vapor flows sequentially through the connection apertures 126, the first valve chest 120, the inter-valve chest flow passage 112, the second valve chest 130, and the canister connection port 102 into the canister. The fuel vapor also directly enters the second valve chest 130 and flows through the canister connection port 102 into the canister.

Namely the structure of the fuel cut-off valve 100 of the embodiment makes the two different flows of the fuel vapor.

One flow is a first vapor current flowing through the first valve chest 120, the inter-valve chest flow passage 112, the second valve chest 130, and the canister connection port 102 into the canister. The other flow is a second vapor current flowing through the second valve chest 130 and the canister connection port 102 into the canister. The first vapor current is caused by the inflow of the fuel vapor through the multiple connection apertures 126, whereas the second vapor current is caused by the inflow of the fuel vapor through the single small-diameter connection aperture 136. The difference between the opening areas of these connection apertures 126 and 136 causes the first vapor current to have the higher flow force and the higher flow rate of the fuel vapor than those of the second vapor current. Namely the first vapor current is predominant in the flow of fuel vapor through the fuel cut-off valve 100.

In the refueling process, with the release of fuel vapor into the canister, the fuel level in the fuel tank FT further rises to reach the preset first level FL1, which is identical with the bottom face of the first valve chest plate 121 of the first valve chest 120 as shown in FIG. 1. At this fuel level, no fuel vapor is flowed through the connection apertures 126 into the first valve chest 120. In this state, the first valve chest 120 is connected to the canister via the inter-valve chest flow passage 112, the second valve chest 130, and the canister connection port 102. The inner pressure of the first valve chest 120 is substantially equal to the atmospheric pressure. The pressure of the fuel vapor surrounding the first valve chest 120 is higher than the atmospheric pressure. Such a pressure difference between the inside and the outside of the first valve chest 120 causes the fuel in the fuel tank FT to be instantaneously flowed through the connection apertures 126 into the first valve chest 120.

The abrupt inflow of the fuel due to this pressure difference immediately raises the fuel level in the first valve chest 120. The resulting buoyancy promptly moves up the first float 124 to be in contact with the seat element 123. This closes the opening 122 and cuts off the first vapor current, which is predominant in the flow of fuel vapor through the fuel cut-off valve 100. The cutoff of the first vapor current increases the inner pressure of the fuel tank FT and raises the fuel level in a filler pipe (not shown) for refueling into the fuel tank FT. The connection aperture 136 is formed as the small-diameter opening to allow only a restricted inflow of the fuel vapor into the second valve chest 130. This structure ensures the increase in inner pressure of the fuel tank FT. A refueling gun (not shown) detects the rise of the fuel level in the filler pipe and automatically stops the fuel supply. The connection aperture 136 open to the second valve chest 130 allows the continuous inflow of the fuel vapor as the second vapor current. This second vapor current effectively prevents an abrupt increase in inner pressure of the fuel tank FT and a resulting backflow of the fuel.

In the refueling process, the fuel level in the fuel tank FT further rises to reach the preset second level FL2, which is identical with the bottom face of the second valve chest plate 131 of the second valve chest 130 as shown in FIG. 1. At this fuel level, no fuel vapor is flowed through the connection aperture 136 into the second valve chest 130. In a similar manner to the operations in the first valve chest 120, this cuts off the inflow of the fuel vapor through the connection aperture 136. The fuel is instantaneously flowed into the second valve chest 130 due to the pressure difference between the inside and the outside of the second valve chest 130.

The abrupt inflow of the fuel due to this pressure difference immediately raises the fuel level in the second valve chest 130. The resulting buoyancy and the pressing force of the spring 134d promptly move the second float 134 up to be in contact with the seat element 133. This closes the upstream end opening 132 and cuts off the second vapor current. Namely when the fuel level in the fuel tank FT rises to reach the preset second level FL2, the fuel tank FT is closed from the canister to effectively prevent the outflow of the liquid fuel into the canister. This causes a further increase in inner pressure of the fuel tank FT and prohibits any further fuel supply. The structure of the fuel cut-off valve 100 seals the fuel tank FT from the canister in two different stages in the refueling process. Even after the fuel level in the fuel tank FT reaches the preset first level FL1 that is close to the full level, the structure of the fuel cut-off valve 100 allows the fuel supply to be continued until the fuel level further rises to reach the preset second level FL2. The structure also effectively prevents an abrupt increase in inner pressure of the fuel tank FT and a resulting backflow of the fuel.

When consumption of the fuel in the fuel tank FT lowers the fuel level below the preset second level FL2, the fuel in the second valve chest 130 flows out to the fuel tank FT via the connection aperture 136. The second float 134 accordingly decreases its buoyancy and moves down. The float body 134a of the second float 134 first starts moving down, and the valve disc 134c is detached from the seat element 133 to open the upstream end opening 132. A small-diameter through hole 134e formed on the center of the valve disc 134c connects the second valve chest 130 to the flow path of the canister connection port 102 across the valve disc 134c. Such connection reduces the pressure difference across the valve disc 134c and weakens the sticking force of the valve disc 134c to the seat element 133, thus making the second float 134 smoothly go down.

When further consumption of the fuel in the fuel tank FT lowers the fuel level below the preset first level FL1, the fuel in the first valve chest 120 quickly flows out to the fuel tank FT via the multiple connection apertures 126. The first float 124 then rapidly loses its buoyancy and moves down to open the opening 122.

(4) Effects of Fuel Cut-OFF Valve 100

The fuel cut-off valve 100 of the embodiment has various advantages, in addition to those discussed above:

(4)-1 The fuel is quickly flowed into the first valve chest 120 or into the second valve chest 130 by the pressure difference between the inside and the outside of the valve chest 120 or 130. When the fuel level reaches the preset first level FL1 and then the preset second level FL2, the first float 124 and the second float 134 respectively move up to close the opening 122 and the upstream end opening 132 in the first valve chest 120 and in the second valve chest 130. This arrangement increases the reproducibility of the fluid level for a first stop of the refueling gun and the fuel level for a final stop of the refueling gun, thus ensuring the stable refueling level.

(4)-2 The continued fuel supply between the first stop and the final stop of the refueling gun is ascribed to the inflow of the fuel vapor via the small-diameter connection aperture 136. This desirably controls the continued fuel supply to the final stop of the refueling gun and ensures the stable refueling level. The fuel may enter the second valve chest 130 via the connection aperture 136 due to the wavy fuel surface, before the second float 134 starts moving up. The small diameter of the connection aperture 136 allows for only a small quantity of the fuel inflow and thus desirably prevents the liquid fuel from flowing out to the canister.

(4)-3 The first valve chest 120 and the second valve chest 130 are arranged side by side, such that the first float 124 and the second float 134 move up and down in parallel with each other in the corresponding valve chests 120 and 130. This arrangement desirably reduces the dead space for fuel storage in the vicinity of the upper wall of the fuel tank FT and increases the effective volume of the fuel tank FT.

(4)-4 The fuel is flowed into the second valve chest 130 via the connection aperture 136, which is formed in the second valve chest plate 131 on the bottom of the valve casing 110. When the fuel level in the fuel tank FT lowers below the second valve chest plate 131, the fuel is flowed out from the second valve chest 130 into the fuel tank FT through the connection aperture 136. With a decrease in fuel level, the second float 134 moves down in the second valve chest 130 to open the upstream end opening 132 of the canister connection port 102. During a drive of the vehicle with a decrease in fuel level in the fuel tank FT, this arrangement effectively ensures the release of the fuel vapor to the canister.

(4)-5 The inter-valve chest flow passage 112 is extended to the lower end of the second valve chest 130. The end of the inter-valve chest flow passage 112 is accordingly apart from the upstream end opening 132. Even when the fuel flows from the first valve chest 120 through the inter-valve chest flow passage 112 into the second valve chest 130, this arrangement effectively prevents the outflow of the liquid fuel into the flow path of the canister connection port 102 and thereby into the canister.

(4)-6 In the first valve chest 120, the first float 124 formed as a single resin member moves up and down to open and close the opening 122. In the closed state of the opening 122, that is, in the cutoff state of the first vapor current, there is still the second vapor current in the second valve chest 130. Even if the cutoff of the first vapor current is imperfect, the leaked fuel vapor in the first vapor current joins with the fuel vapor in the second vapor current to be flowed out to the canister. The single resin member of the first float 124 is thus sufficient to close the opening 122 in the first valve chest 120. This simplified structure without a spring and other relevant elements desirably facilitates the assembly of the first valve chest 120 and does not require adjustment of the spring load in the first valve chest 120.

B. Second Embodiment

Figure 2:
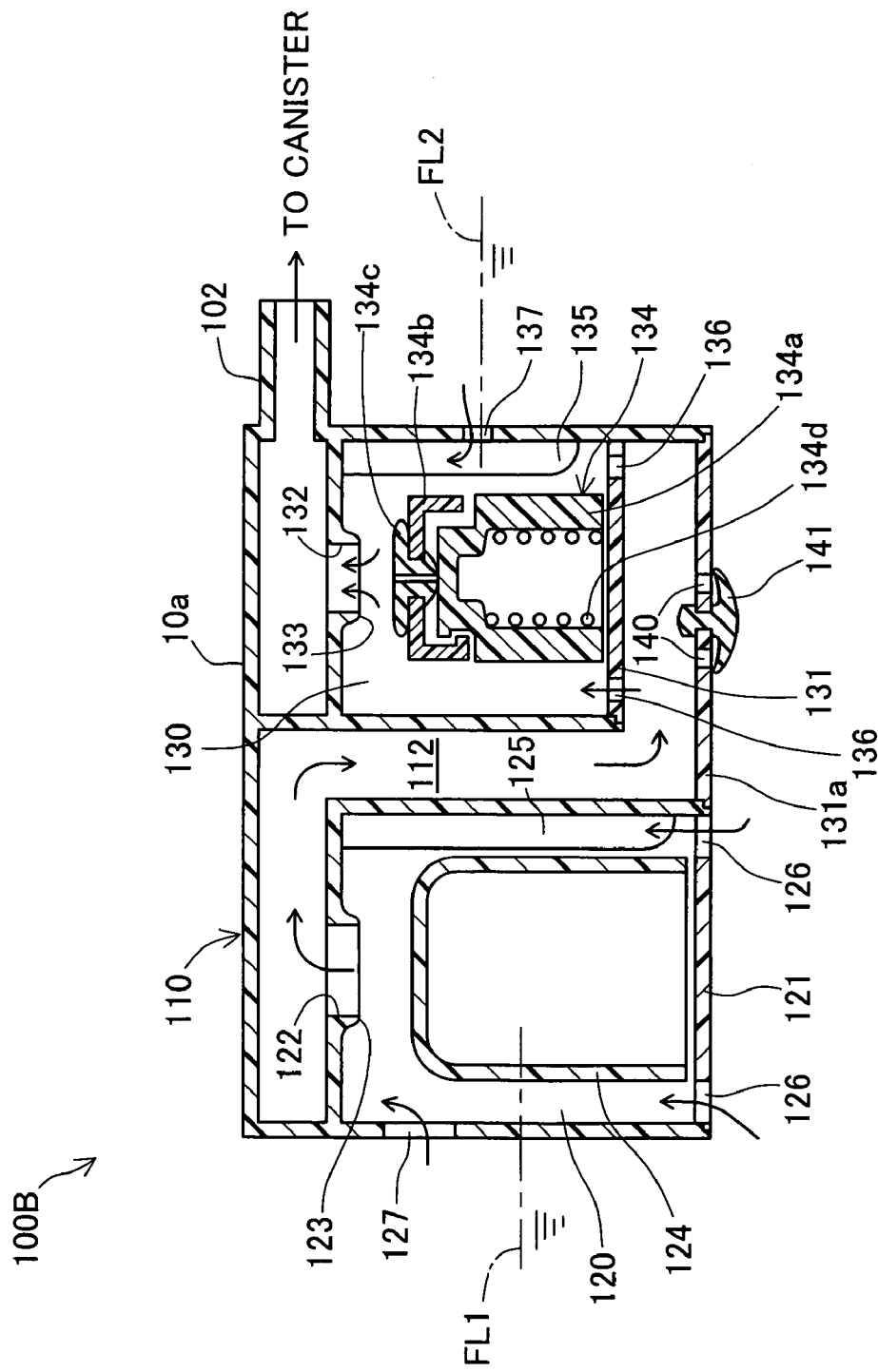
FIG. 2 is a sectional view schematically illustrating the structure of another fuel cut-off valve in a second embodiment of the invention.

FIG. 2 is a sectional view schematically illustrating the structure of another fuel cut-off valve 100B in a second embodiment of the invention. The primary difference of the second embodiment from the first embodiment is the state of change in fuel level in the first valve chest 120 and the second valve chest 130. The fuel cut-off valve 100B of the second embodiment has a large-diameter side through hole 127 formed in a side wall of the first valve chest 120 and a small-diameter side through hole 137 formed in a side wall of the second valve chest 130. The second valve chest plate 131 is located inside the valve casing 110 to define the second valve chest 130. A casing bottom wall 131*a* of valve casing 110 has a bottom through hole 140 and an umbrella valve 141 to open and close the bottom through hole 140. The fuel cut-off valve 100B of this embodiment is designed as an inner tank type. The canister connection port 102 is protruded from a side wall of the upper casing member 110*a* to reduce the total height of the fuel cut-off valve 110B. Otherwise the structure of the fuel cut-off valve 100B of the second embodiment is the same as the structure of the fuel cut-off valve 100 of the first embodiment.

The following description regards the valve operations of the fuel cut-off valve 100B of the second embodiment.

When the fuel level in the fuel tank FT reaches the bottom face of the first valve chest plate 121 of the first valve chest 120, the fuel is flowed through the multiple connection apertures 126 into the first valve chest 120. The presence of the side through hole 127 in the structure of the second embodiment does not cause the pressure difference between the inside and the outside of the first valve chest 120, unlike the structure of the first embodiment. When the fuel level reaches the preset first level FL1, the first float 124 moves up in the first valve chest 120 to close the opening 122 and cut off the first vapor current. In the closed state of the opening 122, the small-diameter side through hole 137 controls the inflow of the fuel vapor into the second valve chest 130 and thus ensures an increase in inner pressure of the fuel tank FT.

Until the fuel level reaches the preset first level FL1, the umbrella valve 141 is pressed by the fuel mass to close the bottom through hole 140 in the casing bottom wall 131*a* and accordingly close the inter-valve flow passage 112. This arrangement ensures the smooth flow of the first vapor current.

When the fuel level in the fuel tank FT further rises to reach the preset second level FL2, which is identical with the level of the side through hole 137, the fuel flows into the second valve chest 130 via the side through hole 137. The fuel level in the second valve chest 130 is thus made equal to the second level FL2. The second float 134 then moves up to close the upstream end opening 132 and cut off the second vapor current. The closed state of the opening 122 by the first float 124 and the small-diameter of the side through hole 137 cause the pressure difference between the inside and the outside of the second valve chest 130. The fuel is thus quickly flowed into the second valve chest 130 due to this pressure difference in the fuel cut-off valve 100B of the second embodiment in the same manner as discussed in the first embodiment.

In the structure of the fuel cut-off valve 100B, the umbrella valve 141 does not receive the pressure from the fuel mass at the lowered fuel level. The fuel in the second valve chest 130 is thus flowed out to the fuel tank FT via the bottom through hole 140.

The fuel cut-off valve 100B of the second embodiment has the similar valve operations to those of the first embodiment to cut off the first vapor current and the second vapor current according to the fuel level. In the structure of the fuel cut-off valve 100B, the side through hole 137 is additionally formed in the side wall of the fuel cut-off valve 100B to cut off the second vapor current. The preset second level FL2 depends upon the position of the side through wall 137 and may be close to the upper wall of the fuel tank FT. This arrangement desirably reduces the dead space for fuel storage in the vicinity of the upper wall of the fuel tank FT and increases the effective volume of the fuel tank FT.

C. Third Embodiment

Figure 3:
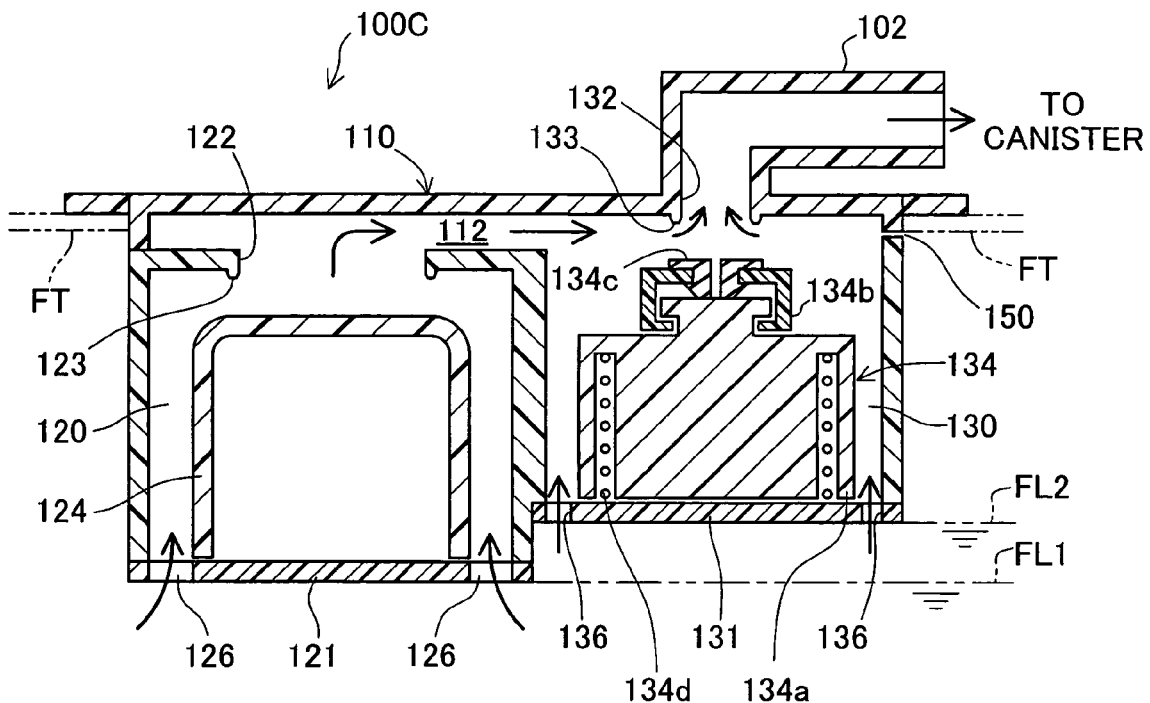
FIG. 3 is a sectional view schematically illustrating the structure of still another fuel cut-off valve in a third embodiment of the invention.

FIG. 3 is a sectional view schematically illustrating the structure of still another fuel cut-off valve 100C in a third embodiment of the invention. The fuel cut-off valve 100C of this embodiment is also designed as an inner tank type and has the similar structure to that of the fuel cut-off valve 100 of the first embodiment, except the design of the inter-valve chest flow passage 112 connecting the first valve chest 120 to the second valve chest 130 and the presence of an inner-tank connection aperture 150. In the fuel cut-off valve 100C of the third embodiment, the inter-valve chest flow passage 112 is formed along the first valve chest 120 and the second valve chest 130 and communicates with the upper end of the second valve chest 130. The inner-tank connection aperture 150 is located above the second valve chest 130 and is formed at a position closest to the upper wall of the fuel tank FT. The inner-tank connection aperture 150 connects the second valve chest 130 to the fuel tank FT even in the state where the second float 134 closes the upstream end opening 132 of the canister connection port 102. The inner-tank connection aperture 150 is formed to have a smaller diameter than those of multiple connection apertures 136 formed for the fuel inflow and outflow.

In the fuel cut-off valve 100C, the inter-valve chest flow passage 112 communicates with the upper end of the second valve chest 130. Regardless of this structural difference, the closing and opening operations of the openings 122 and 132 by the first float 124 and the second float 134 in the fuel cut-off valve 100C of the third embodiment is similar to those in the fuel cut-off valve 100 of the first embodiment. The fuel cut-off valve 100C with the inner-tank connection aperture 150 has the valve operation to open the canister connection port 102 as discussed below.

A decrease in fuel level after the inflow of the fuel into the second valve chest 130 reduces the buoyancy applied to the second float 134 and makes the second float 134 start moving down. In this state, in the case where the valve disc 134 is somehow kept stuck to the seat element 133, the lowered fuel level in the second valve chest 130 causes the second valve chest 130 to have a negative pressure relative to the fuel tank FT. In the structure of the third embodiment, the inner-tank connection aperture 150 formed in the second valve chest 130 allows the remaining vapor in the fuel tank FT to enter the second valve chest 130 at the lowered fuel level in the second valve chest 130. The presence of the inner-tank connection aperture 150 desirably prevents the second valve chest 130 from having a negative pressure due to the lowered fuel level in the second valve chest 130. This structure of the third embodiment thus effectively prevents the valve disc 134c of the second float 134 from being unnecessarily kept seated on the seat element 133 to continuously close the canister connection port 102, but ensures the flow of the fuel vapor from the fuel tank FT through the canister connection port 102 into the canister. The inner-tank connection aperture 150 has the small diameter and is located very close to the upper wall of the fuel tank FT. This layout substantially eliminates the potential influence of the inflow of the liquid fuel or the fuel vapor into the second valve chest 130 on the smooth operations of the second float 134.

D. First Modified Example

Figure 4:
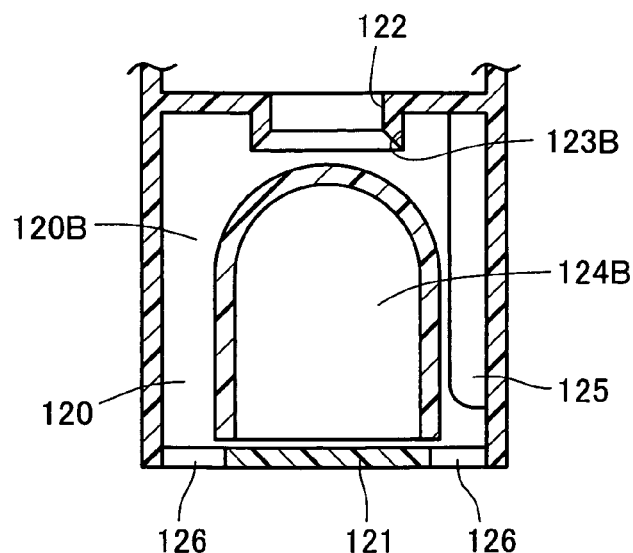
FIG. 4 shows the structure of a first valve chest in a first modified example.

FIG. 4 shows the structure of a first valve chest 120B in a first modified example. In this modified structure, the first valve chest 120B has a seat element 123B, which is formed as a cone-shaped recess around the periphery of the opening 122. A first float 124B has an arch-shaped upper end to be fit in and engage with the cone-shaped recess of the seat element 123B. The engagement of the arch-shaped upper end of the resin first float 124B with the cone-shaped recess of the resin seat element 123B desirably enhances the closing property.

E. Second Modified Example

Figure 5:
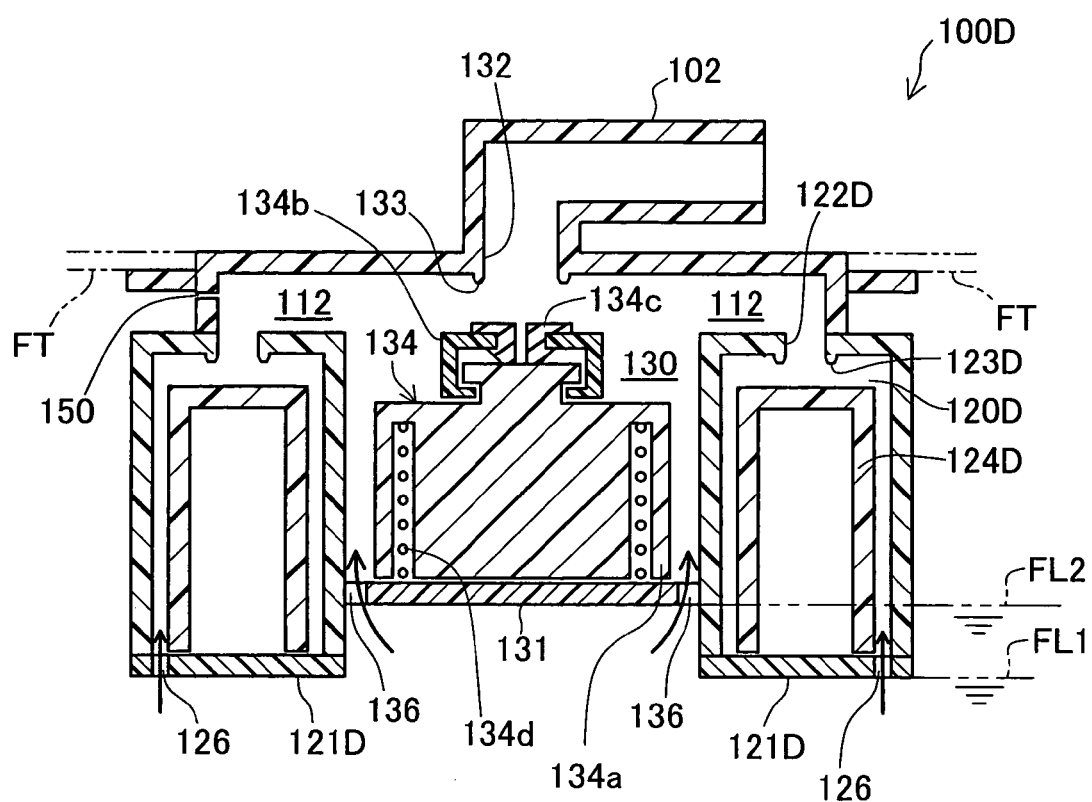
FIG. 5 is a sectional view schematically illustrating the structure of another fuel cut-off valve in a second modified example.

FIG. 5 is a sectional view schematically illustrating the structure of another fuel cut-off valve 100D in a second modified example. The fuel cut-off valve 100D of the second modified example is characterized by the design of a first valve chest 120D and a first float 124D to close the inter-valve chest flow passage 112 at the preset first level FL1. The fuel cut-off valve 100D has the second valve chest 130 located on its center and the first valve chest 120D arranged outside the second valve chest 130. The first valve chest 120D is designed in a ring shape to surround the second valve chest 130 and has the ring-shaped first float 124D included therein. The ring-shaped first float 124D has a large submerged volume even at a relatively low level of the fuel flowed into the first valve chest 120D. This structure of the second modified example decreases the required height of the first float 124D to obtain the same buoyancy as that of the first float 124 in the structure of the first embodiment. This arrangement flattens the first float 124D, the first valve chest 120D, and the fuel cut-off valve 100D, thus effectively reducing the dead space in the fuel tank FT and increasing the effective volume of the fuel tank FT. The structure of the second modified example has the inner-tank connection aperture 150 that connects the inter-valve chest flow passage 112 to the fuel tank FT. The inter-valve chest flow passage 112 is also connected to the second valve chest 130 and thus effectively prevents a potential pressure decrease to a negative level due to the presence of the inner-tank connection aperture 150.

The embodiments and their modified examples discussed above are to be considered in all aspects as illustrative and not restrictive. There may be many other modifications, changes, and alterations without departing from the scope or spirit of the main characteristics of the present invention. For example, a partition wall 112a (see FIG. 1) to define the inter-valve chest flow passage 112 between the first valve chest 120 and the second valve chest 130 may have a shorter length or may have a through hole.

All changes within the meaning and range of equivalency of the claims are intended to be embraced therein. The scope and spirit of the present invention are indicated by the appended claims, rather than by the foregoing description.

What is claimed is:

1. A fuel cut-off valve that is attached to an upper portion of a fuel tank and connects and disconnects inside with and from outside of the fuel tank according to a level of fuel in the fuel tank, said fuel cut-off valve comprising:

a valve casing that forms a first valve chest and a second valve chest connected to the fuel tank and has an inter-valve chest flow passage connecting the first valve chest to the second valve chest and a canister flow path connecting the second valve chest to a canister placed outside the fuel tank;

a first float that is located in the first valve chest and moves up and down according to the fuel level in the fuel tank to open and close the inter-valve chest flow passage, the first float moving up to close the inter-valve chest flow passage when the fuel level reaches a preset first level; and a second float that is located in the second valve chest and moves up and down according to the fuel level in the fuel tank to open and close the canister flow path, the second float moving up to close the canister flow path when the fuel level reaches a preset second level that is higher than the preset first level.

2. A fuel cut-off valve in accordance with claim 1, wherein the valve casing has a first connection aperture that enables the fuel to be flowed into the first valve chest and vary a fuel level in the first valve chest, and a second connection aperture that enables the fuel to be flowed into the second valve chest and vary a fuel level in the second valve chest, the second connection aperture having a smaller opening area than an opening area of the first connection aperture.

3. A fuel cut-off valve in accordance with claim 1, wherein the valve casing has a ventilation hole that connects the second valve chest to the fuel tank, the ventilation hole having an opening diameter to control an inflow of fuel vapor from the fuel tank into the second valve chest and thereby increase an inner pressure of the fuel tank when the first float closes the inter-valve chest flow passage.

4. A fuel cut-off valve in accordance with claim 1, wherein the valve casing has the first valve chest and the second valve chest arranged adjacent to each other, such that the first float and the second float move up and down in parallel with each other in the first valve chest and in the second valve chest.

5. A fuel cut-off valve in accordance with claim 1, wherein the valve casing is designed to discharge the fuel from the second valve chest into the fuel tank when the fuel level lowers below a bottom face of the valve casing.

6. A fuel cut-off valve in accordance with claim 1, wherein the inter-valve chest flow passage of the valve casing is extended to a lower end of the second valve chest.

7. A fuel cut-off valve in accordance with claim 1, wherein the valve casing has an inner-tank connection aperture that connects the second valve chest to the fuel tank even when the second float moves up to close the canister flow path, the inner-tank connection aperture enabling a remaining vapor in the fuel tank to be flowed into the second valve chest at a decrease in fuel level in the second valve chest.

\* \* \* \* \*